(12) United States Patent
Mcananama et al.

(10) Patent No.: US 12,557,200 B2
(45) Date of Patent: Feb. 17, 2026

(54) LIGHTING DEVICE GROUPINGS

(71) Applicant: JDRF Electromag Engineering Inc., Mississauga (CA)

(72) Inventors: James Graham Mcananama, Burlington (CA); Paul Quevedo, Toronto (CA); Carlos Fernandes, Burlington (CA); Elias Boukhers, Hamilton (CA); Roumanos Dableh, Oakville (CA)

(73) Assignee: JDRF Electromag Engineering Inc., Mississauga (CA)

( * ) Notice: Subject to any disclaimer, the term of this patent is extended or adjusted under 35 U.S.C. 154(b) by 99 days.

(21) Appl. No.: 18/568,698

(22) PCT Filed: Jun. 9, 2022

(86) PCT No.: PCT/IB2022/055392
§ 371 (c)(1),
(2) Date: Dec. 8, 2023

(87) PCT Pub. No.: WO2022/259209
PCT Pub. Date: Dec. 15, 2022

(65) Prior Publication Data
US 2024/0284578 A1    Aug. 22, 2024

Related U.S. Application Data

(60) Provisional application No. 63/202,409, filed on Jun. 10, 2021.

(51) Int. Cl.
*H05B 47/195* (2020.01)
*H05B 47/105* (2020.01)
*H05B 47/175* (2020.01)

(52) U.S. Cl.
CPC ......... *H05B 47/195* (2020.01); *H05B 47/105* (2020.01); *H05B 47/198* (2024.01)

(58) Field of Classification Search
CPC ...... H05B 47/10; H05B 47/105; H05B 47/11; H05B 47/115; H05B 47/14; H05B 47/155;
(Continued)

(56) References Cited

U.S. PATENT DOCUMENTS 7,382,271 B2    6/2008    McFarland
8,159,156 B2 *  4/2012    Henig ............... H05B 47/199
                                                  315/363

(Continued)

OTHER PUBLICATIONS

PCT International Application No. PCT/IB22/55392, International Search Report and Written Opinion of the International Searching Authority, dated Sep. 23, 2022, 7 pages.

*Primary Examiner* — Jason M Crawford
(74) *Attorney, Agent, or Firm* — DLA Piper LLP (US)

(57) ABSTRACT

An example of an apparatus is provided. The apparatus includes a communications interface to receive data from a plurality of lighting devices. The data from a lighting device includes a distance and a bearing for neighboring lighting devices of the lighting device. The neighboring lighting devices are selected from the plurality of lighting devices. In addition, the apparatus includes a memory storage unit to store the data received via the communications interface, wherein the data is to be stored in a database. Furthermore, the apparatus includes an aggregator to generate aggregated data for each lighting device from the data in the database. The aggregated data includes data from the plurality of lighting devices. The apparatus also includes a processor to classify each lighting device of the plurality of lighting devices in a group selected from a plurality of groups based on the aggregated data.

18 Claims, 10 Drawing Sheets

(58) Field of Classification Search
CPC ... H05B 47/175; H05B 47/195; H05B 47/198
See application file for complete search history.

(56) References Cited

U.S. PATENT DOCUMENTS

| | | | |
|---|---|---|---|
| 8,416,713 B2 | 4/2013 | Simons et al. | |
| 8,457,793 B2 | 6/2013 | Golding et al. | |
| 8,587,225 B2 | 11/2013 | Ashar et al. | |
| 8,710,772 B2 | 4/2014 | Henig et al. | |
| 8,729,835 B2 | 5/2014 | Henig et al. | |
| 8,909,380 B2 | 12/2014 | Golding et al. | |
| 8,928,232 B2 * | 1/2015 | Aggarwal | H05B 47/18 |
| | | | 315/153 |
| 8,994,295 B2 | 3/2015 | Mohan et al. | |
| 9,002,522 B2 | 4/2015 | Mohan et al. | |
| 9,323,233 B1 | 4/2016 | Mohan et al. | |
| 9,345,115 B2 | 5/2016 | Mohan | |
| 9,538,625 B2 * | 1/2017 | Szabados | H05B 47/18 |
| 9,544,978 B2 | 1/2017 | Mohan et al. | |
| 9,575,478 B2 | 2/2017 | Ericsson et al. | |
| 9,585,227 B2 | 2/2017 | Mohan et al. | |
| 9,585,228 B2 | 2/2017 | Patel et al. | |
| 9,615,434 B2 * | 4/2017 | Vangeel | F24F 11/62 |
| 9,618,915 B2 | 4/2017 | Mohan et al. | |
| 9,655,215 B1 * | 5/2017 | Ho | H05B 45/10 |
| 9,655,995 B2 | 5/2017 | Xie | |
| 9,713,232 B2 * | 7/2017 | Creusen | H05B 47/18 |
| 9,736,910 B2 | 8/2017 | Chen | |
| 9,807,849 B2 | 10/2017 | Bhatkar et al. | |
| 9,872,271 B2 | 1/2018 | Ericsson et al. | |
| 9,927,782 B2 | 3/2018 | Mohan et al. | |
| 9,961,750 B2 | 5/2018 | Leinen et al. | |
| 10,117,308 B2 | 10/2018 | Patel et al. | |
| 10,178,737 B2 | 1/2019 | Mohan et al. | |
| 10,182,487 B2 | 1/2019 | Mohan et al. | |
| 10,201,063 B2 | 2/2019 | Leinen et al. | |
| 10,382,284 B1 * | 8/2019 | Slupik | H05B 47/199 |
| 10,542,610 B1 * | 1/2020 | Slupik | H05B 47/105 |
| 10,548,204 B2 | 1/2020 | Leinen et al. | |
| 10,585,406 B2 | 3/2020 | Mohan et al. | |
| 10,694,606 B1 * | 6/2020 | Westrick, Jr. | H05B 47/105 |
| 10,932,349 B1 * | 2/2021 | Westrick, Jr | H05B 47/115 |
| 11,003,147 B2 * | 5/2021 | Smith | H04L 12/2809 |
| 2006/0074494 A1 | 4/2006 | McFarland | |
| 2009/0045971 A1 | 2/2009 | Simons et al. | |
| 2011/0031897 A1 | 2/2011 | Henig et al. | |
| 2011/0057581 A1 | 3/2011 | Ashar et al. | |
| 2012/0086363 A1 | 4/2012 | Golding et al. | |
| 2012/0130544 A1 | 5/2012 | Mohan et al. | |
| 2012/0161643 A1 | 6/2012 | Henig et al. | |
| 2012/0194083 A1 | 8/2012 | Henig et al. | |
| 2013/0088168 A1 | 4/2013 | Mohan et al. | |
| 2013/0134886 A1 | 5/2013 | Golding et al. | |
| 2013/0183352 A1 | 7/2013 | Xie | |
| 2013/0184892 A1 | 7/2013 | Mohan et al. | |
| 2013/0221203 A1 * | 8/2013 | Barrilleaux | G01J 1/0403 |
| | | | 250/208.2 |
| 2014/0031987 A1 | 1/2014 | Ericsson et al. | |
| 2014/0167653 A1 * | 6/2014 | Chobot | H05B 47/11 |
| | | | 315/362 |
| 2014/0175990 A1 * | 6/2014 | Bhatkar | H05B 47/11 |
| | | | 315/154 |
| 2014/0222213 A1 | 8/2014 | Mohan et al. | |
| 2014/0235269 A1 | 8/2014 | Ericsson et al. | |
| 2014/0249679 A1 | 9/2014 | Billard et al. | |
| 2014/0257572 A1 * | 9/2014 | Mohan | H05B 47/115 |
| | | | 700/275 |
| 2014/0354161 A1 * | 12/2014 | Aggarwal | H05B 47/105 |
| | | | 315/153 |
| 2015/0076993 A1 | 3/2015 | Mohan | |
| 2015/0223309 A1 | 8/2015 | Mohan et al. | |
| 2015/0250042 A1 * | 9/2015 | Aggarwal | H05B 47/18 |
| | | | 315/312 |
| 2016/0004237 A1 * | 1/2016 | Mohan | F24F 11/46 |
| | | | 700/275 |
| 2016/0218804 A1 * | 7/2016 | Raj | H05B 47/1995 |
| 2016/0219676 A1 | 7/2016 | Mohan et al. | |
| 2016/0286624 A1 | 9/2016 | Patel et al. | |
| 2017/0026119 A1 * | 1/2017 | Raj | H04L 67/12 |
| 2017/0094750 A1 | 3/2017 | Chen | |
| 2017/0127372 A1 | 5/2017 | Patel et al. | |
| 2017/0127495 A1 | 5/2017 | Mohan et al. | |
| 2017/0187454 A1 * | 6/2017 | Zhang | H04W 4/023 |
| 2017/0231061 A1 * | 8/2017 | Deese | G06V 10/751 |
| 2017/0231066 A1 * | 8/2017 | Roberts | H05B 47/18 |
| 2017/0245351 A1 * | 8/2017 | Leinen | H05B 45/12 |
| 2018/0177024 A1 | 6/2018 | Mohan et al. | |
| 2018/0220515 A1 | 8/2018 | Leinen et al. | |
| 2018/0248624 A1 * | 8/2018 | Raj | H05B 47/1995 |
| 2019/0132934 A1 | 5/2019 | Leinen et al. | |
| 2020/0119945 A1 * | 4/2020 | Smith | H04L 12/2823 |
| 2021/0068236 A1 | 3/2021 | Mohan et al. | |
| 2023/0142829 A1 * | 5/2023 | Dableh | H05B 47/115 |
| | | | 356/4.07 |
| 2024/0144517 A1 * | 5/2024 | Van De Sluis | G06T 19/006 |
| 2024/0284578 A1 * | 8/2024 | Mcananama | H05B 47/198 |

* cited by examiner

12345# LIGHTING DEVICE GROUPINGS

CROSS-REFERENCE TO RELATED APPLICATION

This application is the National Stage filing under 35 U.S.C. 371 of International Application No. PCT/IB2022/055392, filed Jun. 9, 2022, which claims priority to U.S. Provisional Patent Application No. 63/202,409, filed Jun. 10, 2021, which are both incorporated by reference in their entireties.

BACKGROUND

Buildings have rooms which may be used for varying purposes. For example, some rooms may be used as a general meeting room where several individuals may congregate to facilitate communication, such as for a meeting. As another example, some rooms may be used as a private office which may be assigned to one individual at a time, where the individual may have privacy to improve concentration. Other types of rooms may include break rooms, lunch rooms, washrooms, libraries, mechanical rooms, etc. Accordingly, rooms may have a variety of sizes and shapes and are typically separated by a boundary, such as a wall or partition.

Light fixtures may be used to illuminate a room. Accordingly, each light fixture is installed in the building may be wired to a controller such as a wall mounted light switch to operate the light fixtures. For example, the controller may control the light fixtures in a room or some of the light fixtures in a portion of the room.

BRIEF DESCRIPTION OF THE DRAWINGS

Reference will now be made, by way of example only, to the accompanying drawings in which.

SUMMARY

Figure 1:
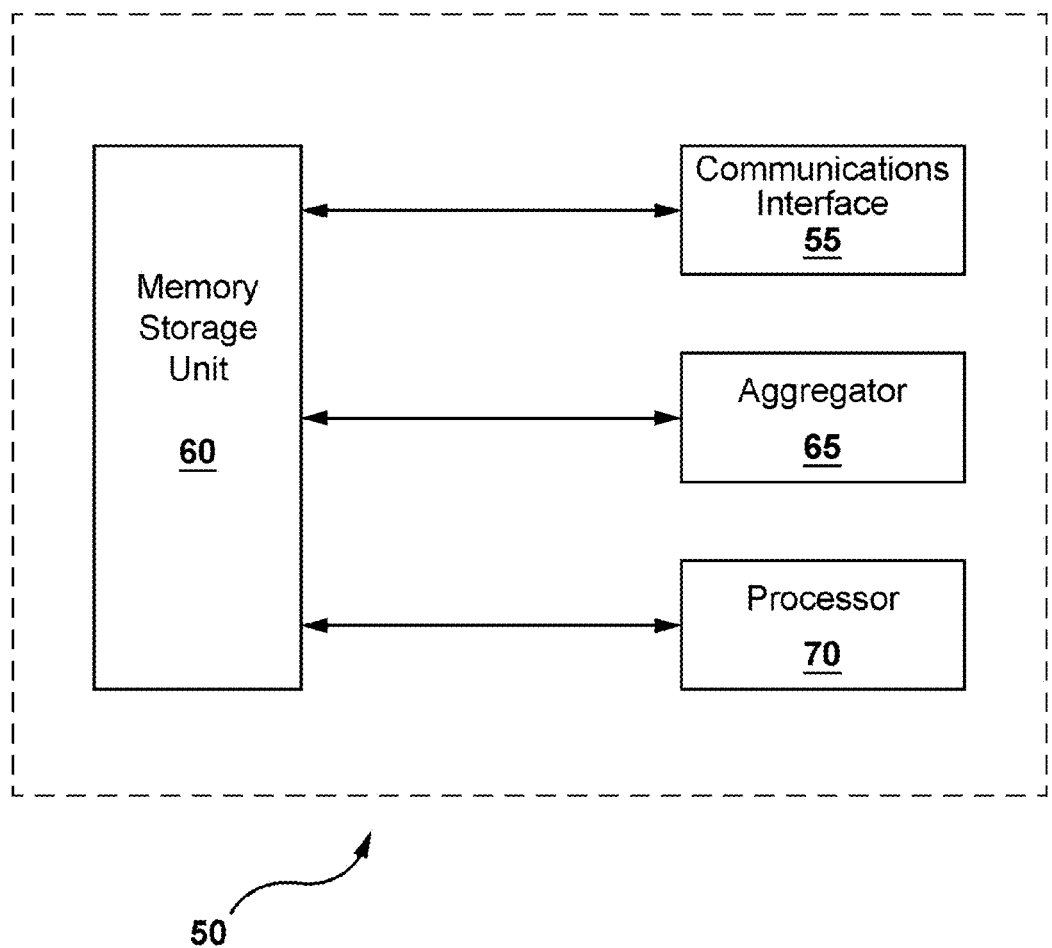
FIG. 1 is a schematic representation of the components of an example of an apparatus to communicate with a set of lighting devices to generate groups from a plurality of lighting devices.

The invention described herein relates to the autonomous formation of a functional group based on factors such as co-location in the same room or area. For each light fixture or lighting device (used interchangeably herein), a sensor can be used to detect neighboring light fixtures to determine a range and bearing for the neighboring light fixture using optical modules and/or infrared LEDs and/or radio frequency received signal strength indication (RSSI) measurements. For example, a neighboring light fixture may vary the output to be detected and a range and bearing measurement may be determined based on a detected pattern and/or light intensity. For each light fixture, the reference direction for the bearing measure may be offset by an unknown amount due to the installation process. Accordingly, the bearing estimates for different light fixtures may use different directions for the reference or zero-degree direction. The data from each light fixture is collected to generate a light fixture layout using the neighbor-neighbor range and bearing data. The manner by which the layout is generated uses an iterative least squares method.

Therefore, the light fixtures autonomously and automatically self-organize into logical group configurations. The logic of the grouping is based on the colocation of sensors of each light fixture within the same room, the layout of the lighting fixtures within the room, and the fusion of sensory data such as daylight readings and occupant motion patterns. In addition, self-organization may involve running computations across a subgraph of the mesh where each light fixture refines the calculation over one or more iterations to optimize an attribute to be used by other light fixtures. These distributed calculations can be initiated by any one of the light fixtures in the subgraph and are idempotent in their results for a given computational cycle. It is to be appreciated by a person of skill with the benefit of this description that the use of distributed algorithms provides the ability to self-organize in the absence of a central aggregator. In other examples, the self-organization may be such that a controller like a wall switch controls light fixtures within the same room. Furthermore, the light fixtures may further be arranged into groups which exhibit synchronized operation by responding to the same control messages in unison.

The manner in which wall switch groups are grouped or arranged is not limited and may reflect the intention of a lighting designer. For example, light fixtures with sensors (i.e. nodes) may be assigned to a group located within the same room. In another example, the area spanned by the light fixtures controlled by a given wall switch may be limited to a predetermined maximum area regardless of the number of groups controlled by a given wall switch. In another example, the nodes belonging to a given group may form a continuous and uniform arrangement. In a further example, the nodes within the same room may be arranged into a logical number of groups (e.g. dependent on the number of lights in the room, the arrangement of lights in the room and other factors). It is to be appreciated that in some examples, contiguous sections may be selected to avoid irregular shaped groups.

The grouping of the light fixtures may be carried out at a controller, such as a wall switch. The process may involve recursively aggregating the metadata from each of its nearest neighbors and their nearest neighbors to a termination point. This aggregation of data is then processed to determine which light fixtures occupy the same room as the controller to create useful logical groups among the light fixtures within a room. This process may also be carried out among multiple controllers or at light fixtures wherein each autonomously self-optimizes the control groups. In addition, this process may also be carried out in a mesh of light fixtures and controllers wherein distributed algorithms are used to optimize the mapping of light fixtures to controllers. Furthermore, this process may also be carried out between the light fixtures, the controllers, and an enterprise system wherein light fixture arrangement is fused with floor plan drawings by the enterprise system. Optimal mappings of light fixtures to controllers is then pushed out from the enterprise system into the mesh of controllers and light fixtures.

DETAILED DESCRIPTION

In the following detailed description, certain embodiments of the system will be described, however those skilled in the art will appreciate that variations exist and can be implemented in a manner that is consistent with the novel aspects of this disclosure.

A light fixture system and a process of grouping the system is provided. In the present example, the process of grouping light fixtures with sensors to controllers starts with an a priori unknown number of sensors (each mounted to a light fixture or switched receptacle) and an unknown number of controllers, such as wall switches. Next, each sensor takes turns establishing a nearest neighbor using a multi-shouter process. At the end of this step, each light fixture has a list of metadata about each of its nearest neighbors. In some examples, metadata from additional light fixtures beyond the nearest neighbors may also be included in the list. Accordingly, this metadata includes the range and bearing estimates from the light fixture to each of its neighbors. In further examples, the metadata may also include, kinematic state estimates of the light fixture in multiple coordinate frames, a list of first degree neighbors, and miscellaneous information about the states and modes of the light fixture and consistency of observations of neighbor light fixtures.

Referring to FIG. 1, a schematic representation of an apparatus to communicate with a set of lighting devices to generate groups from a plurality of lighting devices, is generally shown at 50. The apparatus 50 may include additional components, such as various additional interfaces and/or input/output devices such as indicators to interact with a user of the apparatus 50. In the present example, the apparatus 50 may be a wall switch controller to control one or more group of lighting devices. Accordingly, the apparatus 50 may include displays for viewing the operational status of the lighting devices as well as a user interface to receive control commands and/or other input to program the operation of the lighting devices. In the present example, the apparatus 50 includes a communications interface 55, a memory storage unit 60, an aggregator 65, and a processor 75.

In the present example, the communications interface 55 is to communicate with a plurality of lighting devices. The lighting devices are not particularly limited and may be disposed at various locations within an area or building, such as within one or more rooms, and within communication range of the apparatus 50. The communications interface 55 is to receive data from a plurality of lighting devices to carry out a grouping operation. The communication range of the communications interface is not particularly limited and may vary depending on different factors, such as barriers that may interfere with the transmission of signals. In other examples, the communication range may also be extended with relay devices. In further examples, some or all of the lighting devices in the plurality of lighting devices may include relay functionality.

The data received from each lighting device in communication with the apparatus 50 includes data about neighboring lighting devices of the lighting device. In particular, the data received includes a distance as well as a bearing associated with each neighboring lighting device. It is to be appreciated by a person of skill with the benefit of this description that the definition of a neighboring lighting device is not particularly limited and may be varied between different applications. Accordingly, the manner by which neighboring lighting devices are selected by each lighting device may depend on factors such as a maximum distance and whether there are any barriers between the lighting devices, such as a wall.

The communications interface 55 may also be used in some examples to transmit a command or control signal to the plurality of lighting devices. The commands transmitted to the plurality of lighting devices is not particularly limited and may be directed to a specific lighting device or group of lighting devices. For example, each command transmitted by the apparatus 50 may include a device identifier associated with the command. Accordingly, the apparatus 50 may be used to control a subset of lighting devices among the plurality of lighting devices.

The manner by which the communications interface 55 communicates with the plurality of lighting devices is not particularly limited. In the present example, the communications interface 55 may communicate with lighting devices over a network, which may be a public network shared with a large number of connected devices, such as a WiFi network or cellular network. The connection with external devices may also involve sending and receiving electrical signals via a wired connection in some other examples. Since the apparatus 50 is typically mounted at a stationary location on a wall, using a wired connection between the apparatus and each lighting device may provide a robust connection. In other examples, the communications interface 55 may connect to devices in the plurality of lighting devices wirelessly to simplify the setup procedure since the process does not involve placing wires in the walls. For example, the communications interface 55 may be a wireless interface to transmit and receive wireless signals directly to each lighting device via a Bluetooth connection, radio signals or infrared signals and subsequently relayed to additional devices.

The memory storage unit 60 is to store the data received from the plurality of lighting devices via the communications interface 55. In addition, the memory storage unit 60 may be used to store grouping data generated by the processor 70 as described in greater detail below. The manner by which the memory storage unit 60 stores the data is not particularly limited and may involve storing the data in one or more databases. For example, the memory storage unit 60 may store the data received from the plurality of lighting devices and the grouping data in separate databases. In the present example, the memory storage unit 60 may be in communication with the aggregator 65 and the processor 70, where they each may have capabilities and permissions to read and write to databases stored in the memory storage unit 60 directly.

The memory storage unit 60 may be also used to store addition data to be used by the apparatus 50. For example, the memory storage unit 60 may store mapping data and environmental data. Mapping data is not particularly limited and may include data determined at the apparatus 50 or received from one or more lighting devices. In the present examples, the mapping data may provide the location within a room or building of one or more lighting devices in the plurality of lighting devices. Environmental data may include data relating to the environment, such as ambient light in a room from windows or other sources. For example, the environmental data may include information such as sunrise and sunset times as well as weather information. It is to be appreciated by a person of skill with the benefit of this description that the mapping data and the environmental data may be used by the processor to group the plurality of lighting devices.

The mapping of the lighting devices may also include a mapping of the room boundaries to define a space in which the lighting devices are disposed. For example, the lighting devices may be distributed throughout multiple rooms and/or hallways. The determination of the mapping may be carried out by the apparatus based on aggregated data or the mapping data may be received from the lighting devices. The process of determining a mapping may involve locating and classifying room boundaries as well as considering the bearing and distances between different lighting devices as detected by each lighting device. Accordingly, the apparatus 50 may receive data from multiple lighting devices within the room boundary, or wall. The data may include identifiers of lighting devices within the same room as the apparatus 50 such that the lighting devices may be grouped together by the processor 70 as described in further detail below. In some examples, mapping data received by the apparatus 50 from one or more lighting devices may be compared with internally generated mapping data to validate the mapping data to determine which lighting devices are within a room boundary.

In the present example, the memory storage unit 60 may include a non-transitory machine-readable storage medium that may be any electronic, magnetic, optical, or other physical storage device. In other examples, the memory storage unit 60 may be an external unit such as an external hard drive, or a cloud service providing content. The memory storage unit 60 may also be used to store instructions for general operation of the apparatus 50. In particular, the memory storage unit 60 may store an operating system that is executable by the processor 70 to provide general functionality to the apparatus 50, for example, functionality to support various applications. Furthermore, the memory storage unit 60 may also store control instructions to operate other components and peripheral devices of the apparatus 50, such additional sensors, cameras, and user interfaces.

The aggregator 65 is in communication with the memory storage unit 60 and is configured to read data from the memory storage unit 60. In some examples, the aggregator 65 may write aggregated data on the memory storage unit 60 after processing the data received from the lighting devices. In the present example, the aggregator 65 aggregates the data collected from lighting devices. The manner by which the data is aggregated is not particularly limited. For example, the data may be aggregated for a specific lighting device. In this example, a lighting device may include a unique identifier and the aggregator 65 may search the memory storage unit 60 for all data associated with the specific lighting device. Accordingly, the aggregator 65 will obtain data received from neighboring lighting devices or other lighting devices that provided data to the apparatus 50. The aggregator 65 combines this data to generate aggregated data for this specific lighting device. It is to be appreciated by a person of skill with the benefit of this description that the number of lighting devices contributing to the aggregated data for the specific lighting device is not limited. For example, lighting devices considered to be neighboring lighting devices may provide a bearing and a distance value to the specific lighting device. Additional lighting devices beyond what may be considered a neighboring lighting device may also provide data to be aggregated. In addition, some lighting devices may also provide data to indicate barriers between the specific lighting device as well as the lighting device providing the data.

The aggregated data for each lighting device provides redundant data describing the plurality of lighting devices. For example, the bearing and distance numbers from a pair of lighting devices may be used to verify the relative positions of the lighting devices. By carrying out the aggregation process on additional lighting devices in an iterative process, the positions of the lighting devices may be mapped for a space. In examples, where the apparatus 50 is used as a reference point, the absolute positions of the lighting devices may be mapped for a space.

In addition to mapping the relative and/or absolute positions of the lighting devices, the bearing values for each lighting device may be determined. It is to be appreciated by a person of skill with the benefit of this description that the installation of each lighting device may introduce an offset to the reference bearing since the rotational orientation, such as the zero-degree direction, of the plurality of lighting devices is not calibrated. By processing the aggregated data, a bearing offset may be calculated for each lighting device. The calculation of the offset bearing is not limited and may be carried out by the processor 70 or at each lighting device in examples where the lighting devices can receive data from neighboring lighting devices.

The processor 70 is to classify each lighting device from the plurality of lighting devices into a group based on the aggregated data generated by the aggregator. The group into which the lighting devices are to be classified are not limited and may be carried out in accordance with any of the methods described herein. In the present example, each space may include multiple groups of lighting devices. In some examples, the lighting devices may be grouped by location, such as a group of nearby lighting devices or a group of lighting devices within a predetermined distance of the apparatus 50. In other examples, the lighting devices may be grouped by type of lighting device, such as its color or type of illumination provided. In further examples, the lighting devices may be grouped based on other environmental factors, such as the amount of ambient light in portions of a space or based on anticipated used of the space.

There is no limit on the number of lighting devices in a group and each group may have a different number of lighting devices as low as a single lighting device to several lighting devices spanning a large area. It is to be appreciated that the grouping is to be simply the control of a plurality of lights in a space where multiple lighting devices are to be operated in unison. For example, a group of lights may be turned on when the ambient light is low, such as after sunset. In this example, a group of lights near a window may be grouped together as the area further from the window may use light throughout the day as the ambient light from a window may not be sufficient to illuminate that portion of the room. In other examples, lights near the front of a room may be controlled in unison, so that they may be dimmed when there are fewer occupants and brightened when the occupancy increases.

The processor 70 is not particularly limited and may include a central processing unit (CPU), a microcontroller, a microprocessor, a processing core, a field-programmable gate array (FPGA), an application-specific integrated circuit (ASIC), or similar. In the present example, the processor 70 may cooperate with the memory storage unit 60 to execute various instructions stored thereon. For example, the memory storage unit 60 may store an operating system that is executable by the processor 70 to provide general functionality to the apparatus 50, including functionality to group lighting devices as described. Examples of operating systems include Android Things™, Apache Mynewt™, Zephyr™, and Windows 10 IoT™. Further operating systems may also include Windows™, macOS™, iOS™, Android™, Linux™, and Unix™. In further examples, the memory storage unit 60 may be used to store additional applications that are executable by the processor 70 to provide specific functionality to the apparatus 50, such as functionality to send commands to groups of lights or to automatically adjust the lighting in a space based on environmental conditions.

Figure 2:
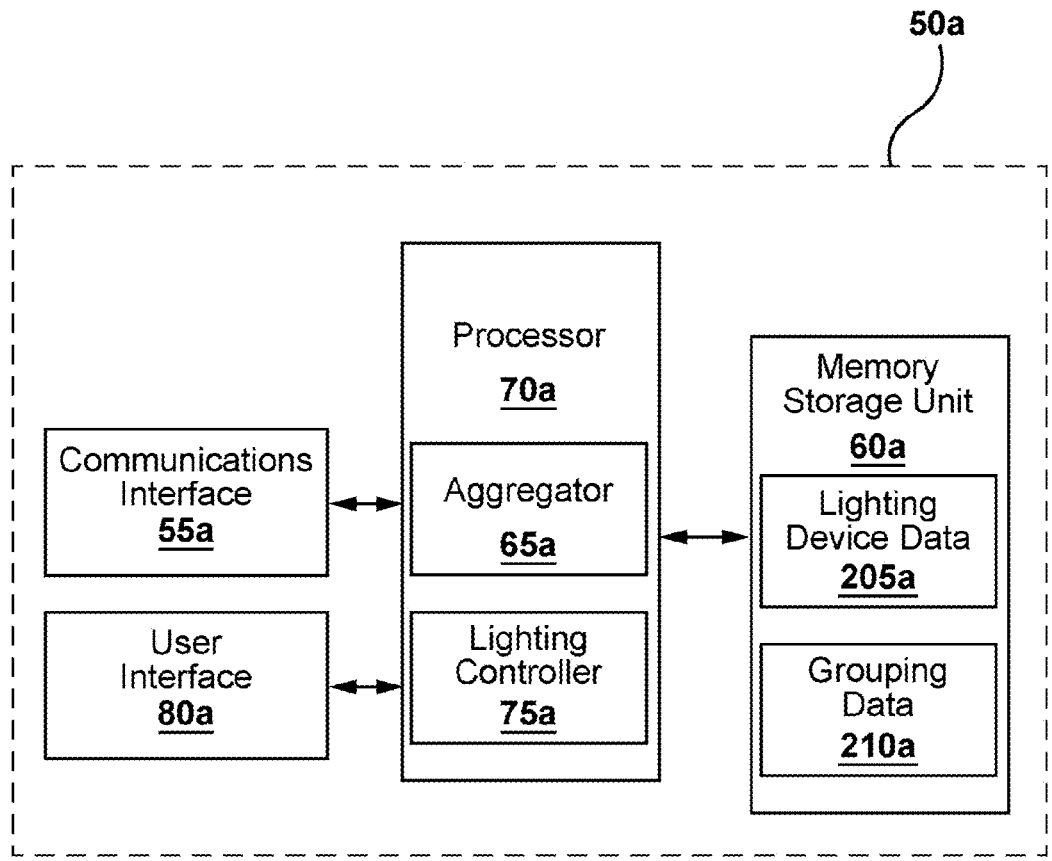
FIG. 2 is a schematic representation of the components of another example of an apparatus to communicate with a set of lighting devices to generate groups from a plurality of lighting devices.

Referring to FIG. 2, a schematic representation of another example of an apparatus 50*a* to communicate with a set of lighting devices to generate groups from a plurality of lighting devices is generally. Like components of the apparatus 50*a* bear like reference to their counterparts in the apparatus 50, except followed by the suffix "a". In the present example, the apparatus 50*a* may be a wall switch controller to control one or more group of lighting devices. In the present example, the apparatus 50*a* includes a communications interface 55*a*, a memory storage unit 60*a*, a processor 70*a*, and a user interface 80*a*. In the present example, the processor 70*a* includes components to operate an aggregator 65*a* and a lighting controller 75*a*.

In the present example, the memory storage unit 60*a* may also maintain databases to store various data used by the apparatus 50*a*. For example, the memory storage unit 60*a* may include lighting device data 205*a* and grouping data 210*a*. The memory storage unit 60*a* may additionally store instructions to carry out operations at the driver level as well as other hardware drivers to communicate with other components and peripheral devices of the apparatus 50*a*, such as various user interfaces to receive input or provide output.

In the present example, the database storing lighting device data 205*a* may store raw data received via the communications interface 55*a* from a plurality of lighting devices. In particular, the lighting device data 205*a* may include information such as an identifier for each lighting device as well as information about neighboring lighting devices, which may include a bearing, a distance and an identifier for each neighboring lighting device. In some examples, each lighting device may provide additional data beyond the neighboring lighting devices within communication range of the lighting devices. In further examples, each lighting device may receive data from lighting devices beyond its communication range through a mesh network of lighting devices.

The database storing the grouping data 210*a* is to store data generated by the processor 70*a* of the groups of lighting devices. In the present example, each lighting device in the plurality of lighting devices is assigned to a group. It is to be appreciated with the benefit of this description that each lighting device may also be part of more than one group depending on how the lighting device is to behave. In examples where a lighting device is to be a member of more than one group, a predetermined order of priority or conflict resolution mechanism for instances where the operation of the groups are not aligned.

The processor 70*a* may carry out instructions to implement various components of the apparatus 50*a*. For example, the processor 70*a* may be programmed to carry out the functionality of the aggregator 65*a*. In addition, the processor 70*a* may be programmed to operate as a lighting controller 75*a* to control a group of lighting devices as determined by the processor 70*a* based on the aggregated data. The manner by which the lighting controller 75*a* controls the lighting devices is not particularly limited. For example, the lighting controller 75*a* may generate a command to be transmitted to a group of lighting devices via the communications interface 55*a*. In particular, the command may cause the group of lighting devices to change the illumination level in a space covered by the group of lighting devices. The command may be broadcasted to all lighting devices within range and include device identifiers to identify the group of lighting devices to which the command is targeted. In other examples, the lighting devices may relay the command to other lighting devices that may be beyond the range of the communications interface 55*a*.

The apparatus 50*a* may also include a user interface 80*a* to receive input from a user as well as to provide output to a user in some examples. In the present example, the apparatus 50*a* is a wall mounted switch for controlling groups of lighting devices in a room. Accordingly, the user interface 80*a* may include a mechanical switch, button, or combination of multiple switches and buttons for controlling the groups of lighting devices in a space. In other examples, the user interface 80*a* may include a touchscreen device having soft switches or virtual switches. Accordingly, the user interface 80*a* may include a graphical user interface. The graphical user interface is not particularly limited and may be dynamically updated based on the groups of lighting devices generated by the processor 70*a*. In some examples, the grouping of lighting devices may be continually monitored and updated by the apparatus 50*a* to automatically adjust if the floor plan, environmental factors, or occupancy patterns change. Furthermore, the user interface 80*a* may provide a user with the capability to re-program the grouping of the lighting devices.

Figure 3:
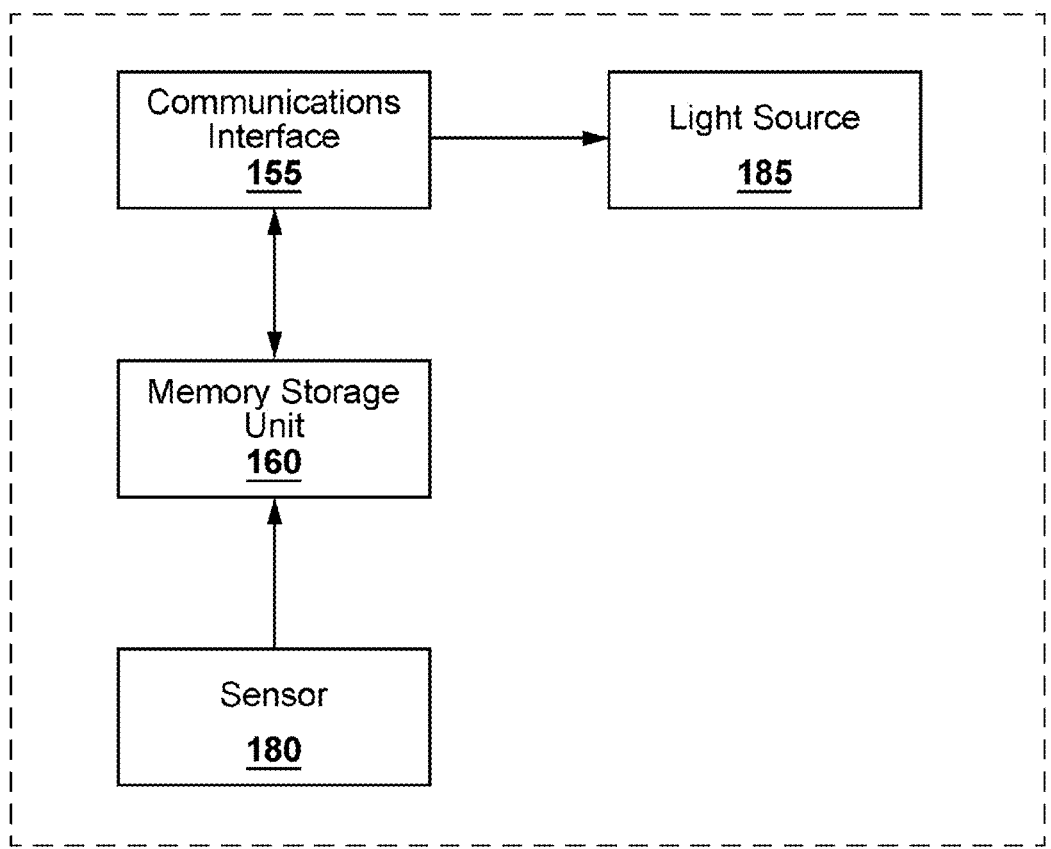
FIG. 3 is a schematic representation of the components of an example of a lighting device for use in a network of lighting devices.

Referring to FIG. 3, a schematic representation of an example of a lighting device for use in a network of lighting devices is generally shown at 150. The lighting device 150 may include additional components, such as various additional interfaces and/or input/output devices such as indicators to interact with a user of the lighting device 150. The interactions may include viewing the operational status, initiating, updating parameters, or resetting the lighting device 150. In the present example, the lighting device 150 is to collect data from other lighting devices in the network of lighting devices for the purposes of grouping the lighting devices in cooperation with the apparatus 50. In the present example, the lighting device 150 includes a communications interface 155, a memory storage unit 160, a sensor 180, and a light source 185.

In the present example, the communications interface 155 is to communicate with the apparatus 50. The lighting device 150 is not particularly limited and may be disposed at any location within an area or building and in any orientation.

The communications interface 155 is to transmit data collected from the sensor 180 which includes data about the distance between the lighting device 150 and neighboring lighting devices. The data transmitted to the apparatus 50 includes data about neighboring lighting devices of the lighting device. In particular, the data transmitted includes a distance as well as a bearing associated with each neighboring lighting device relative to the lighting device 150.

It is to be appreciated by a person of skill with the benefit of this description that the definition of a neighboring lighting device is not particularly limited and may be varied between different applications. Accordingly, the manner by which neighboring lighting devices are selected by each lighting device may depend on factors such as a maximum distance and whether there are any barriers between the lighting devices, such as a wall. In one example, the lighting device may carry out a multi-shouter process to establish a neighboring lighting device relationship. The data transmitted to the apparatus 50 is then to be used by the apparatus 50 to determine a grouping of the lighting device 150.

The memory storage unit 160 is to store local data collected by the sensor 180. In addition, the memory storage unit 160 may store the data received from the plurality of lighting devices via the communications interface 155 in some examples. In the present example, the memory storage unit 160 may be in communication with the communications interface 155 to receive and transmit data to other lighting devices or to an apparatus 50.

The sensor 180 is to measure environmental data in the proximity of the lighting device 150. For example, the sensor 180 may be a low resolution sensor to measure light data from a reflection off a room boundary, such as a wall, or to measure occupancy data by measuring the reflected light from the light source 185. Specifically, the sensor 180 may be a two-dimensional image sensor is capable of capturing images. A lens (not shown) may be used to provide a wide coverage area to increase a field of view of the sensor 180 to detect motion patterns and objects in a larger area. In addition, movement patterns of objects and people within the field of view may also be measured and detected by the sensor 180.

The light source 185 is to emit light. In the present example, the light source 185 is to emit light to illuminate a space. The light may be white light or another color suitable for illuminating a space. In some examples, the light source 185 may additionally emit light having a peak wavelength greater than about 780 nm to be beyond the typical visual range of a human eye. The light source 185 is not particularly limited and may be any device capable of generating light that may be reflected off a surface, such as a room boundary, and detected by the sensor 180. For example, the light source 185 may be an incandescent light bulb, a fluorescent light bulb, or a light emitting diode. The area which the light source 185 illuminates is not particularly limited. In the present example, the light source 185 may project a uniform intensity across the field of view of the sensor 180 such that the sensor 180 can use the light to measure environmental data. In other examples, the light source 185 may project light wider or narrow, or the illumination may not be uniform across substantially all of the field of view.

Figure 4:
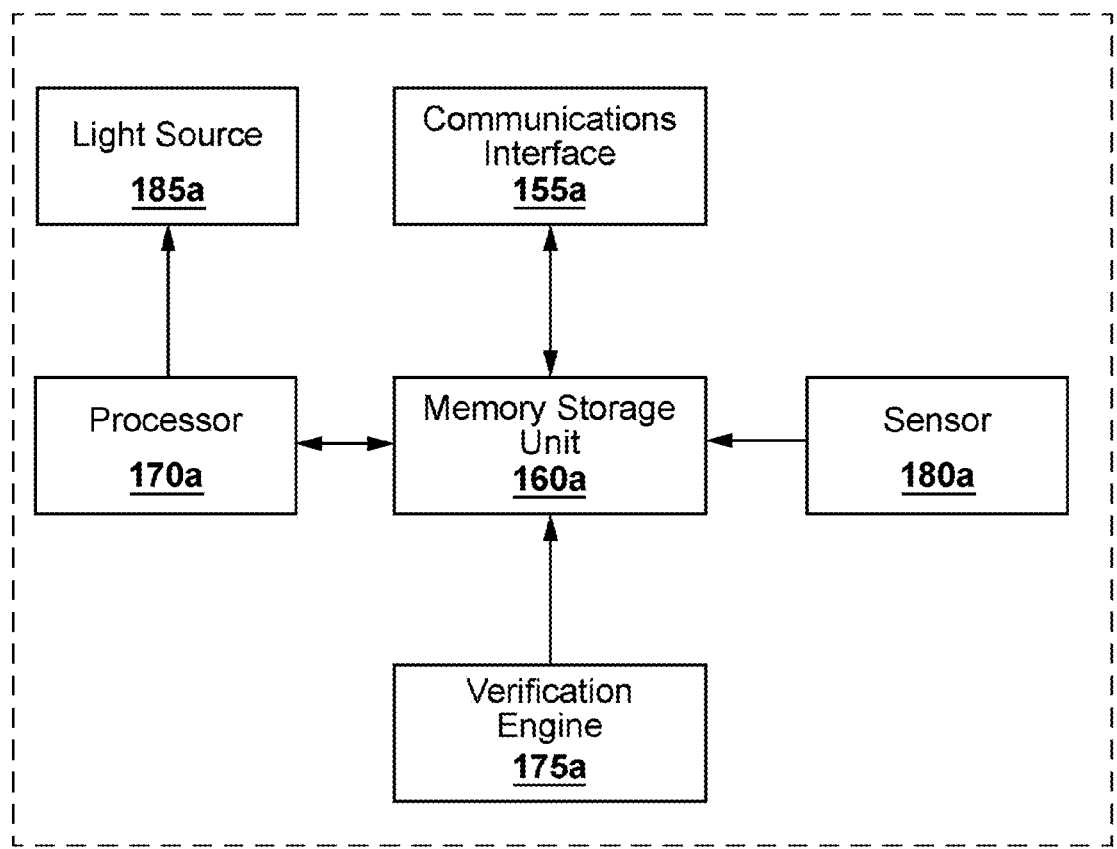
FIG. 4 is a schematic representation of the components of another example of a lighting device for use in a network of lighting devices to generate groups.

Referring to FIG. 4, a schematic representation of another example of a lighting device for use in a network of lighting devices is generally shown at 150a. Like components of the lighting device 150a bear like reference to their counterparts in the lighting device 150, except followed by the suffix "a". The lighting device 150a may include additional components, such as various additional interfaces and/or input/output devices such as indicators to interact with a user of the lighting device 150a. The interactions may include viewing the operational status, initiating, updating parameters, or resetting the lighting device 150a. In the present example, the lighting device 150a is to collect data from other lighting devices in the network of lighting devices for the purposes of self-grouping the lighting devices. In the present example, the lighting device 150a includes a communications interface 155a, a memory storage unit 160a, a processor 170a, a verification engine 175a, a sensor 180a, and a light source 185a.

In the present example, the communications interface 155a is to provide the functionality described above in connection with the communications interface 155. In addition, the communications interface 155a is to communicate with other lighting devices in the network of lighting devices. The lighting devices are not particularly limited and may be disposed at various locations within the same area or building as the lighting device 150a. In addition, the other lighting devices may be similar to the lighting device 150a or may be a different type of lighting device to provide a different type of illumination in the space. The communications interface 155a is to receive data from the other lighting devices to carry out a grouping operation at the lighting device 150a. The communication range of the communications interface is not particularly limited and may vary depending on different factors, such as barriers that may interfere with the transmission of signals. In some examples, the communication range may also be extended with relay devices, which may include other lighting devices in the network of lighting devices with relay functionality.

The data received from other lighting devices in communication with the lighting device 150a includes data about neighboring lighting devices of the other lighting device. In particular, the data received includes a distance as well as a bearing associated with each neighboring lighting device of the other lighting device. It is to be appreciated by a person of skill with the benefit of this description that the definition of a neighboring lighting device is not particularly limited and may be varied between different applications. Accordingly, the manner by which neighboring lighting devices are selected by each lighting device may depend on factors such as a maximum distance and whether there are any barriers between the lighting devices, such as a wall.

In addition, the communications interface 155a receives external sensor data measured by other lighting devices. The external sensor data includes environmental data in the proximity of the lighting device from which the data is received. The external sensor data may be similar to the data collected by the sensor 180a, except from a corresponding sensor at the other lighting device. By receiving this data, the processor 170a may determine features of the based on the aggregation of sensor data from multiple lighting devices.

The memory storage unit 160a is to store the data received from the plurality of lighting devices via the communications interface 155a. In addition, the memory storage unit 160a may be used to store local data collected by the sensor 180a. The manner by which the memory storage unit 160a stores the data is not particularly limited and may involve storing the data in one or more databases. For example, the memory storage unit 160a may store the data received from other lighting devices and the local sensor data in separate databases. In the present example, the data stored in the memory storage unit 160a is to be transmitted to other lighting devices or to an apparatus 50. Accordingly, the memory storage unit 160a is to receive the local sensor data directly from the sensor 180a as well as to receive the network data form other lighting devices via the communications interface 155a.

The processor 170a is to generate grouping data locally at the lighting device 150a. In the present example, the processor 170a generates the grouping data by determining whether each lighting device from the network of lighting devices is in a group based on the data received by the communications interface 155a from the network of lighting devices as well as the data collected by the sensor 180a. The group into which the lighting devices are to be classified are not limited and may be carried out in accordance with any of the methods described herein. In the present example, each space may include multiple groups of lighting devices. In some examples, the lighting devices may be grouped by location, such as a group of nearby lighting devices or a group of lighting devices within a predetermined distance of a reference point. In other examples, the lighting devices may be grouped by type of lighting device, such as its color or type of illumination provided. In further examples, the lighting devices may be grouped based on other environmental factors, such as the amount of ambient light in portions of a space or based on anticipated used of the space.

In the present example, the processor 170a is not particularly limited and may include a central processing unit (CPU), a microcontroller, a microprocessor, a processing core, a field-programmable gate array (FPGA), an application-specific integrated circuit (ASIC), or similar. In the present example, the processor 170a may cooperate with the memory storage unit 160a to execute various instructions stored thereon. For example, the memory storage unit 160a may store an operating system that is executable by the processor 170a to provide general functionality to the lighting device 150a, including controlling the light source 185a. In further examples, the memory storage unit 160a may be used to store additional applications that are executable by the processor 170a to provide specific functionality to the lighting device 150a, such as functionality to self-group and automatically adjust the lighting in a space based on environmental conditions.

The verification engine 175a is to receive external grouping information for other lighting devices in the network of lighting devices via the communications interface 155a to verify the grouping data generated by the processor 170a. In particularly, the verification engine 175a is to verify the members in the group. For example, the external grouping information may include data generated by other lighting devices using a similar process as the one carried out by the processor 170a. For each lighting device in the network of lighting devices, the verification engine 175a may compare the grouping determination by the processor 170a with the determination by other lighting devices. The manner by which the verification engine 175a resolves conflicting grouping data is not limited. In some examples, the verification engine 175a may resolve conflicting information by a voting process. In other examples, each determination may also include a confidence score which can be factored into the voting process.

Figure 5:
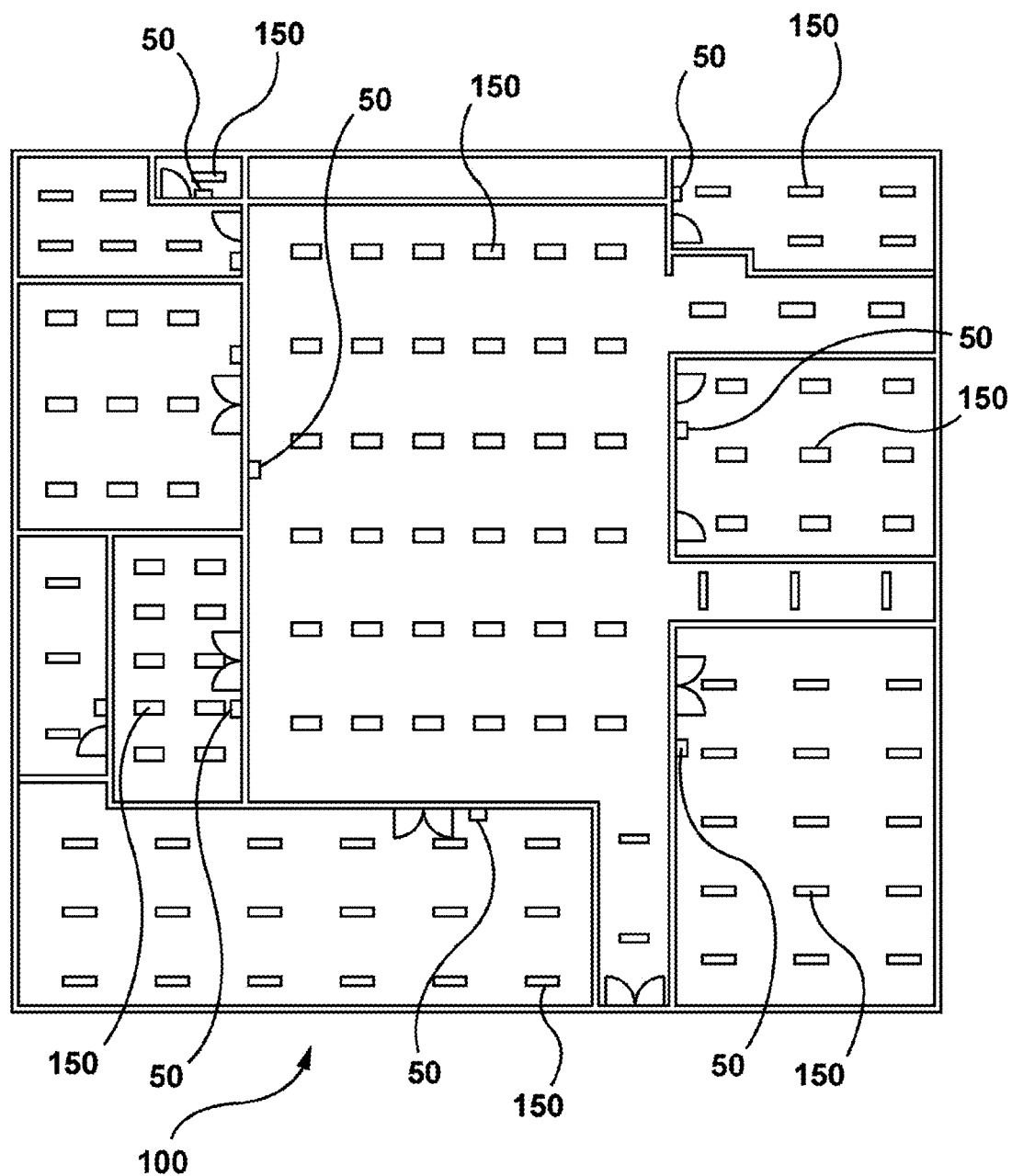
FIG. 5 is a schematic representation of a floorplan where a plurality of lighting devices and a plurality of apparatuses are deployed.

Referring to FIG. 5, a floorplan 100 is generally shown to illustrate the operating of the apparatus 50 for controlling a plurality of lighting devices 150. The floorplan 100 with a plurality of rooms and hallways includes light fixtures 150 and apparatuses 50, such as wall switches. In the present example, the general problem to be solved in grouping light-fixtures to controllers, co-located in the same room can be described through an illustration. The solution is one where each apparatus 50 recursively discovers its nearest neighbors, and their neighbors and then groups with light fixtures 150 within the same room.

Rooms in the building are typically divided using architectural partitions which may include structures such as windows, opaque walls, transparent wall, translucent walls, and/or doorways. Each of these partitions interfere with the transmission of light between any two sensors of separate light fixtures 150. Therefore, the partitions may be detected if the partition is placed between two light fixtures 150, such as by data collected from the respective sensor 180. That is, if a cost is associated with the amount of light lost in transmission for a sensor emitting its IR LED to a sensor detecting IR light with its image sensor, then a room grouping would be one in which the apparatus 50 and all sensors 180 on light fixtures 150 can "see" each other at some maximum "cost". This formulation may be described by graph theory where the apparatus 50 and lighting fixtures within the same room form a rooted tree, weighted graph.

Figure 6A:
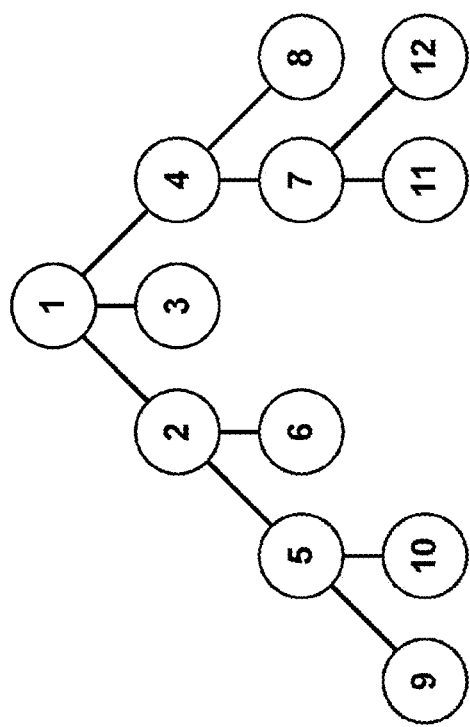
FIG. 6A is a diagram showing the exploration of a mesh using a breadth first search approach.
Figure 6B:
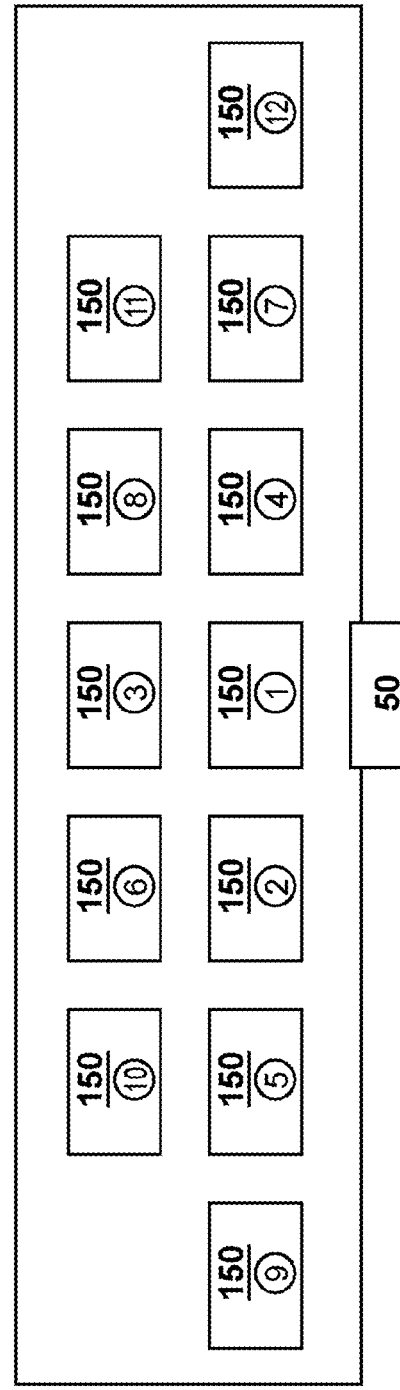
FIG. 6B is a schematic representation of a plurality of lighting devices deployed in a room where the breadth first search approach is applied.
Figure 7A:
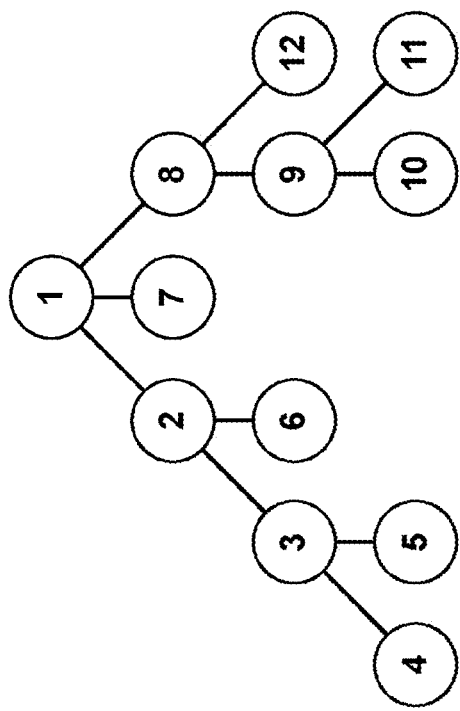
FIG. 7A is a diagram showing the exploration of a mesh using a depth first search approach.
Figure 7B:
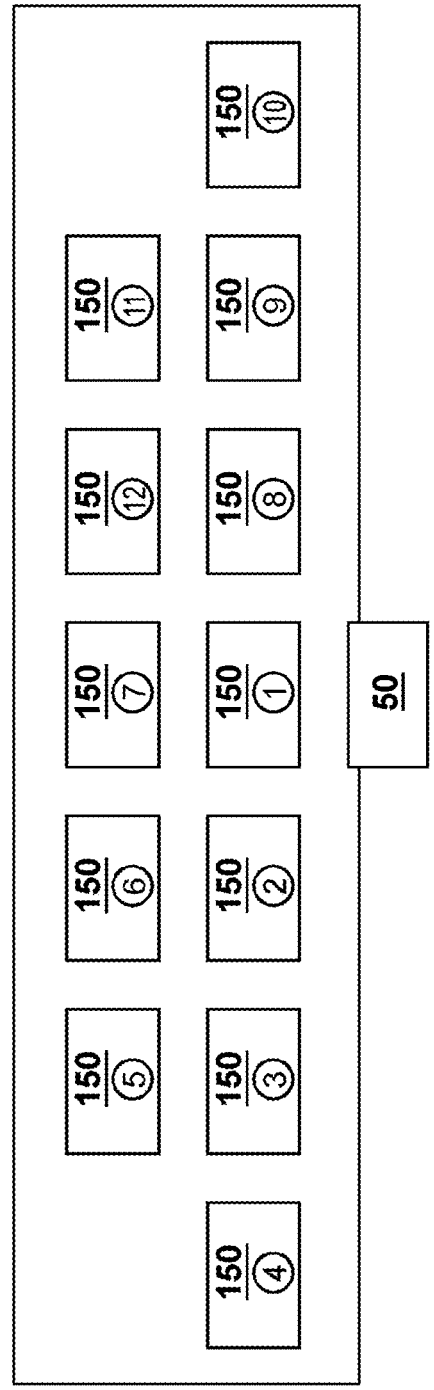
FIG. 7B is a schematic representation of a plurality of lighting devices deployed in a room where the depth first search approach is applied.

The manner by which the light fixtures 150 and the apparatus 50 communicate with each other is not particularly limited and may include a radio mesh network as described above. The radio mesh is searched to find all of the light fixtures 150 that may be in the same room as an apparatus 50. Two approaches for this search are: the breadth first search (BFS) as shown in FIGS. 6A and 6B; and the depth first search (DFS) as shown in FIGS. 7A and 7B. In BFS, the mesh is traversed by fanning out to explore the nearest neighbors, and then their sublevel neighbors, etc. In DFS, the mesh is traversed by exploring as far as possible down each branch before backtracking (e.g. from a neighbor at one degree or TTL (time to live) from the switch, to its neighbor at two TTL from the switch, etc). Of these two approaches, the BFS may be better suited to exploring the mesh based on a 1 TTL hop from a given node.

Figure 8:
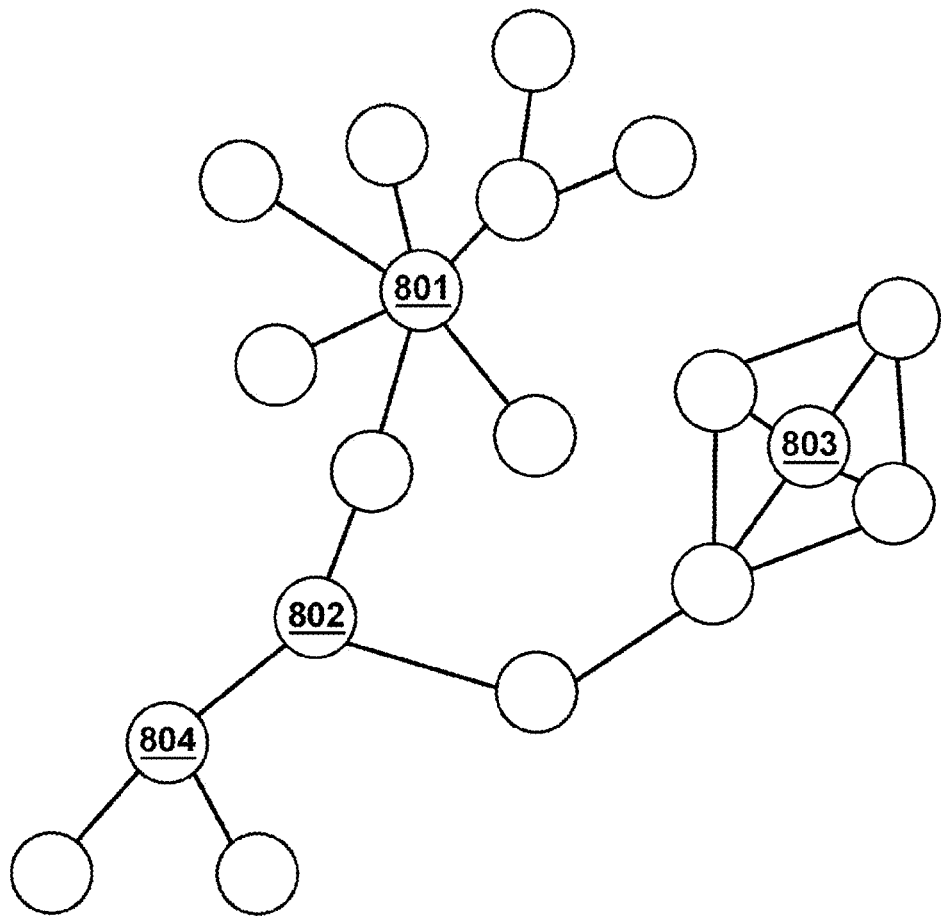
FIG. 8 is a diagram showing a plurality of nodes in a mesh network.

In some examples, additional insight related to concepts such as the centrality, closeness, betweenness, and degree/number of connections may be used to group a plurality of light fixtures. In addition to searching the mesh for nodes, the paths through the mesh may be explored to compare how well each node can see (i.e. transmit IR light) to each other node. FIG. 8 illustrates how some of these concepts may appear in a light fixture layout. In this example, the node 801 can be described as having a high degree or number of connections to other nodes. The node 802 may be described as having the high amount of betweenness since it is connected to the most sub-graphs. In particular, the node 802 is connected to three sub-graphs centered by nodes 801, 803, and 804. The node 803 may be described as being close as it has access with the most neighbors with a single hop. It is to be appreciated by a person of skill with the benefit of this description that a value to describe the centrality, closeness, betweenness, and degree/number of connections for each light fixture.

Figure 9C:
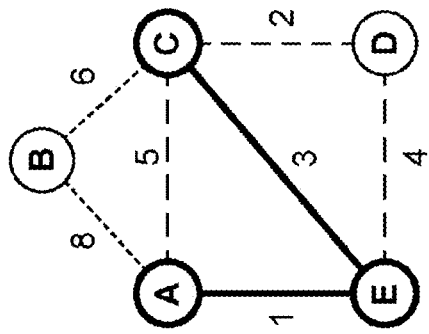
FIG. 9C is a diagram showing the exploration of nodes.
Figure 9B:
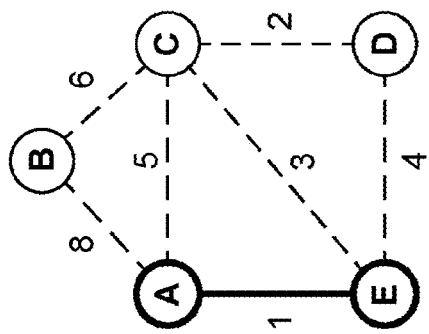
FIG. 9B is a diagram showing the exploration of nodes.
Figure 9E:
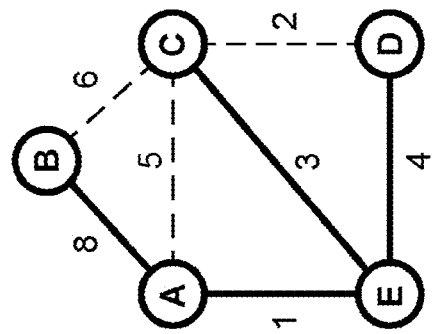
FIG. 9E is a diagram showing the exploration of nodes.
Figure 9A:
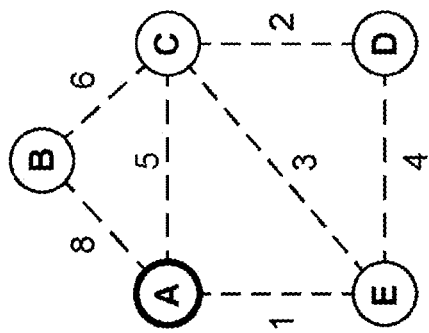
FIG. 9A is a diagram showing the exploration of nodes.
Figure 9D:
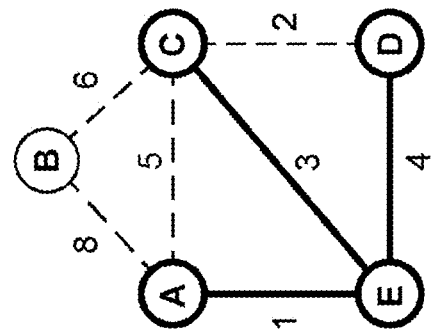
FIG. 9D is a diagram showing the exploration of nodes.

Referring to FIGS. 9A-E, a single source shortest path (SSSP) method may be used to explore these paths. This method calculates the cheapest path between a single root node and all other nodes. For example a lighting device 150 may be assumed to be a node, such as a root node labeled A and the other nodes B to E represent other lighting devices. Each edge weight would be the cost (in an arbitrary unit) of transmitting IR light from one node to other node, across the edge between them. Accordingly, nodes may be discovered based on a one TTL Bluetooth Low Energy (BLE) mesh hop between the end of the graph and any new neighbors. It is to be understood that the cost of adding a new node (or creating a new edge to another existing node) may be based on the intensity of IR light transmitted between the nodes. In FIG. 9A, the cost between each node is illustrated. In FIG. 9B, the cost of transmitting light from A to E is 1 along the path of least cost. FIG. 9C shows the cost of transmitting light from A to C is 4 along the path of least cost. In this example, the path to C goes through E as this is a cheaper path than directly from A to C. FIG. 9D shows the cost of transmitting light from A to D is 5 along the path of least cost. FIG. 9E shows the cost of transmitting light from A to B is 8 along the path of least cost. Lighting devices outside of the room will have a prohibitive cost due to the interference of the architectural partition between the given two nodes.

An A example of the SSSP method is Dijkstra's method. This method may be carried out to run in O(m+n log n)), where m and n are the number edges and nodes respectively. If the edge weights are of a discrete set, then a more efficient version of this method can be written to run O(m log(nk/m)), where k is the number of discrete edge weights).

To detect boundaries for each room, a room boundary determination may be carried out using the data or metadata measured at each light fixture. This data or metadata can be viewed as a description of the cost of transmitting IR light from one node to one of its 1 TTL neighbors. Further, the cost of transmitting IR light across any of the nonempty edge types can be set as infinitely expensive. Accordingly, a rooted tree, weighted graph constructed using a BFS from the apparatus 50 to the extents of nodes on the mesh would result in all lights and switched receptacles within a room being grouped with the apparatus 50.

In an example method of determining room boundaries, a search to find unobstructed line of sight between any radios within some max TTL hop from the apparatus 50. The apparatus 50 initializes a graph representation of the radio network and creates a root node for itself. A recursive BFS graph building process is run until it terminates at some predetermined TTL hop from the apparatus 50. Once the graph building process is terminated, the metadata from all light fixtures within 1TTL is requested and delivered to the apparatus 50. If the metadata indicates an unobstructed line of sight from the source node to the neighboring node, a node is added to the graph for each detected neighbor. If no vertices exist at the neighboring node, a vertex is added to the graph between the source and neighbor, weighted by the range. After the metadata for all neighbors is processed, the process is repeated on each neighbor in order of increasing measured range. The process terminates when the TTL hops from the apparatus 50 reaches a predetermined level.

This process may be sensitive to the prior selection of the maximum TTL parameter. For example, rooms and hallways that are long relative to the location of the apparatus 50, such as the wall switch, have a relatively large maximum TTL hops to span the network. Therefore, the apparatus 50 may be unable to find all of the light fixtures in such a room or hallway if the TTL limit is too low. Conversely, increasing the TTL will result in wasted processing cycles for the apparatus 50 to search through radios outside of a given room for most room sizes which would nominally have a lower spanning maximum TTL.

In another example method of determining room boundaries, a recursive BFS is completed 1 TTL outwards from the apparatus 50, adding all sensors that have an unobstructed line of sight between neighboring radios. Accordingly, no prior information on the network layout is used. The process involves recursively searching across nearest neighbors for any radios that have an unobstructed line of sight. The search naturally terminates when no new radios are found. In this example, the apparatus 50 initializes a graph representation of the radio network and creates a root node for itself. A recursive BFS graph building process is run until it terminates. Once the graph building process is terminated, the metadata from all light fixtures within 1TTL is requested and delivered to the apparatus 50 to be analyzed. If the metadata indicates an unobstructed line of sight from the source node to a neighboring node, the neighboring node is added to the graph and a vertex is added to the graph, between the source and neighbor, weighted by the range. After the metadata for all neighbors are processed, the process is repeated on each neighbor in order of increasing measured range. The process terminates when no more nodes with a line of sight are found.

It was found that this process is able to successfully group the light fixtures within the same room of an apparatus 50, such as a wall switch. Since this process naturally searches the network with no prior information, it may be easier to implement than the first method discussed above.

In another example, other methods of grouping lighting devices may be used. For example, a unicast method of transmitting a message point-to-point between nodes, while groupcast methods publishing a message to zero-or-more subscribing devices may be used in a truly distributed solution to self-grouping or self-assembly of lighting devices into groups. In this example, each lighting device generates data that includes a list of neighboring lighting devices along with the range and bearing to each neighboring lighting device. Each lighting device subscribes to the unicast address of each of its neighboring lighting devices. Subsequently, each lighting device groupcasts its list of neighboring lighting devices. According, each neighboring lighting device obtains data for each of the other neighboring lighting devices. That is, each neighboring lighting device knows its first and second degree neighboring lighting devices. Each lighting device then unicasts the range and bearing measured at the lighting device to each of its neighboring lighting devices. Each lighting device then groupcasts data including a kinematic state estimate in multiple coordinate frames and information about states, modes, and consistency of observing the neighboring lighting devices. After a set time in which the probability of detecting neighboring lighting devices is high, each lighting device filters its list of neighboring lighting devices based on the consistency of observations.

The list of neighboring lighting devices that remains is used in a clustering algorithm. The clustering algorithm uses information about first and second degree neighboring lighting devices to predict logical grouping of the lighting devices. For example, the algorithm may be parameterized to separate lighting devices collocated within a room from sensors in another room or hallway. In addition, the algorithm can be parameterized to create subgroups of devices within a room. The list of clustered neighboring lighting devices may then be used to bound distributed algorithms. These algorithms are initiated and transmitted to neighboring lighting devices within the clustered list. These clustered neighboring lighting devices may participate in the algorithm and relay the result to their own list of clustered neighboring lighting devices. The span of the distributed algorithms is the collective list of clustered lighting devices. Various distributed algorithms may be used to define groups of devices, elect group leaders, and to share information about all devices within a group. In some examples, lighting devices may execute a process to determine a room/area ID that is unique over the whole network. The process may involves holding an election to determine a lighting device with the highest or lowest identifier, such as a device address or serial number, and then basing the room ID on the identifier. This identifier may be common to lighting devices in the area and allow wall switches, third-party systems or mobile devices to issue multicast commands to the lighting devices in the area.

In this example, it is to be appreciated by a person of skill with the benefit of this description that each lighting device is aware of its identity within the mesh, the identity of the network, and the identity of the root node within the spanning tree. Furthermore, each lighting device is aware of the environmental conditions, such as ambient illumination, occupancy state, received signal strength indicator, etc. As a result, each device can estimate the probability of detecting neighboring lighting devices. The detection of architectural barriers can be achieved by comparing observations from a neighboring lighting device under conditions of high probability of detection. For example, if the probability of detection is high but some neighboring lighting devices are only occasionally detected, then it can be assumed that these neighboring lighting devices are behind a barrier such as a closed door. Coordinate frames can be created about several frames of reference such as a room, a building, or the root device in spanning tree. Each coordinate frame can be used to optimize the relative layout of lighting devices against the accumulation of errors from the datum to a given lighting device. States and modes related to area groups and kinematic state can be reset, initialized, and propagated across a mesh in response to changes in network identity, tree root identity, and area group identity. Once a group has been assembled with a leader identified, all devices may subscribe to the identified leader. Further, the behavior of the group may be directed via the leader, such as joining, disjoining, and merging of multiple groups.

In addition to determining room boundaries, the geometric layout of light fixtures within a room may also be determined autonomously. The manner by which the light fixtures are determined is not particularly limited and may include grouping lights around concepts such as daylight groups or motion groups to provide a finer level of control over the lighting scene setting and to improve energy conservation.

Figure 10:
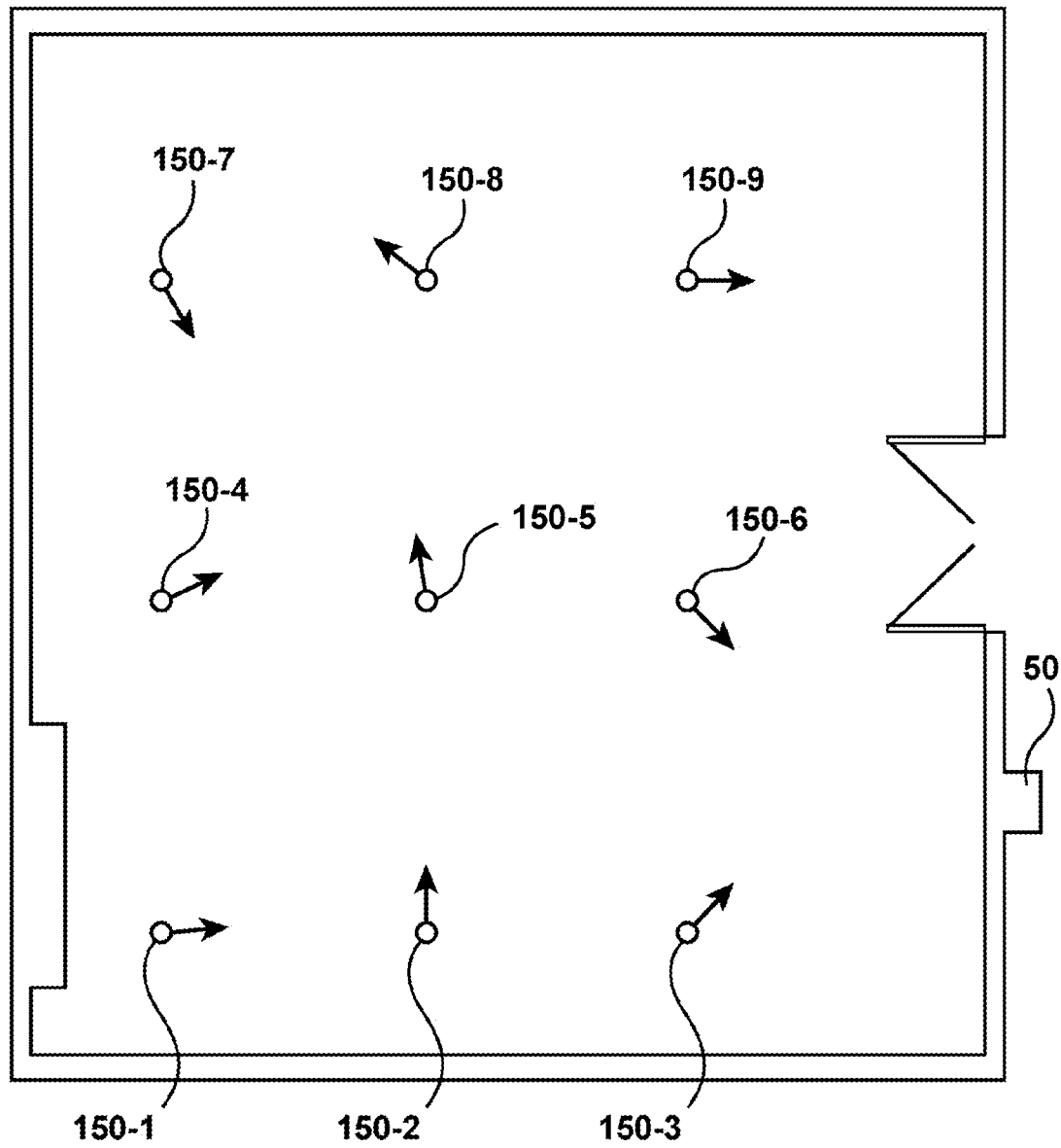
FIG. 10 is a schematic representation of a plurality of lighting devices deployed in a room with random reference bearings after installation.

As an example, the light fixtures within a room may be grouped into rows or columns. Referring to FIG. 10, the geometric layout of light fixtures 150-1, 150-2, 150-3, 150-4, 150-5, 150-6, 150-7, 150-8, and 150-9 (generically, these lighting devices are referred to herein as "lighting device 150" and collectively they are referred to as "lighting devices 150") may be estimate based on their relative range and bearings. Each autonomy sensor in a light fixture 150 has an uncontrolled orientation about the vertical axis and the reference bearing (i.e. zero degrees) for each lighting device is represented by the solid arrows. The manner by which the uncontrolled orientation arises is not limited an may be caused during the installation process where the circular sensor is free to rotate with the light fixture 150 during installation.

Therefore, the relative bearings between sensors in the light fixtures 150 will not be consistent. If all sensors had the same orientation, the relative bearing between neighboring light fixtures 150 are 180 degrees apart. However, with uncontrolled orientations, and relative bearings would not be known. For example, as shown in the above image, the bearing of the sensor in the light fixture 150-2 would be measured as 135° from the sensor in the light fixture 150-3. However, bearing of the sensor in the light fixture 150-3 as measured by the sensor in the light fixture 150-2 would be approximately −90°. Therefore, the heading of each neighboring sensor will need to be estimated as part of estimating the room layout in a Cartesian space using relative range and bearing measurements.

To determine the geometric layout, the state of a sensor may be described by:

$$x_i \begin{bmatrix} x_1 \\ x_2 \\ x_3 \end{bmatrix}$$

where $x_1$ is the distance in meters along some arbitrary horizontal direction, $x_2$ is the distance in meters along a horizontal line that is 90° from the $x_1$ direction, $x_3$ is the angular orientation of the sensor around its vertical axis, positive counterclockwise (CCW) from the $x_1$ axis. The datum or reference light fixture, for this coordinate frame is taken arbitrarily as the location and orientation of the sensor closest to the apparatus 50. According, in FIG. 10, if sensor in the light fixture 150-1 is closest to the apparatus 50, its state would be defined as:

$$x_{55-} \begin{bmatrix} 0 \\ 0 \\ 0 \end{bmatrix}$$

The estimation of the neighboring sensor states proceeds as a recursive non-linear, least square estimation, propagating out from the datum to all the devices within the natural bounds of the chosen coordinate system. For example, a device within a room to all devices within a room or from the root of a spanning tree to all devices within the tree, or from a position on a drawing to the estimated positions of all devices within a building (where data from multiple networks within a building are aggregated on an enterprise system).

The state of each sensor beyond the datum sensor is initialized as a conversion from the polar average range and bearing to an incremental distance between the source node and the new node. In the present example, the angular state, $x_3$, is initialized such that the bearing measured back to the source node differs by 180°. For example, if sensor $x_i$ is the source node and $x_j$ is a successor node, then $x_i$ initializes $x_j$ as:

$$x_j = \begin{bmatrix} x_i[1] + (\text{Range}_{x_i \to x_j} + \text{Range}_{x_j \to x_i})/2 \cdot \cos(\text{Bearing}_{x_i \to x_j} - x_i[3]) \\ x_i[2] + (\text{Range}_{x_i \to x_j} + \text{Range}_{x_j \to x_i})/2 \cdot \sin(\text{Bearing}_{x_i \to x_j} - x_i[3]) \\ \text{Bearing}_{x_i \to x_j} + x_i[3] - 180° - \text{Bearing}_{x_j \to x_i} \end{bmatrix}$$

Once a node is initialized, the node can initialize downstream nodes. In addition, it can also contribute to the estimated state of all neighboring nodes for which it has a range and bearing measurement.

In the present example, the state of each sensor may also be updated. For example, measurements of the sensor $x_j$ by sensor $x_i$ as may be defined as:

$$z_{i \to j} = \begin{bmatrix} \text{Bearing}_{x_i \to x_j} \\ \text{Range}_{x_i \to x_j} \\ \text{Bearing}_{x_j \to x_i} \\ \text{Range}_{x_j \to x_i} \end{bmatrix}$$

The following measurement represents the true states of both nodes by:

$$z_{i \to j} = h(x_i, x_j) = \begin{bmatrix} \operatorname{atan2}\left(\frac{x_j[2] - x_i[2]}{x_j[1] - x_i[1]}\right) - x_i[3] \\ \sqrt{(x_j[1] - x_i[1])^2 + (x_j[2] - x_i[2])^2} \\ \operatorname{atan2}\left(\frac{x_j[2] - x_i[2]}{x_j[1] - x_i[1]}\right) - x_i[3] - 180° \\ \sqrt{(x_j[1] - x_i[1])^2 + (x_j[2] - x_i[2])^2} \end{bmatrix}$$

Since the true state of any node is not known, an estimate of the state may be denoted as $\hat{x}_n$. In addition, measurements are not perfect and so a residual results between an ideal and an observed measurement. Treating $x_i$ as a constant, the residual may be described in terms of measurement noise $v$ and errors in the state estimate of $x_j$:

$$\Delta z = H \Delta x_j + v.$$

For a nonlinear measurement transfer function, H can be linearized at the current state estimate, $\hat{x}_j$ as:

$$H \approx \frac{\partial}{\partial x_j} h |_{\hat{x}_j \hat{x}_i} = \begin{bmatrix} \frac{-(x_j[2] - x_i[2])}{q} & \frac{(x_j[1] - x_i[1])}{q} & 0 \\ \frac{(x_j[1] - x_i[1])}{\sqrt{q}} & \frac{(x_j[2] - x_i[2])}{\sqrt{q}} & 0 \\ \frac{-(x_j[2] - x_i[2])}{q} & \frac{(x_j[1] - x_i[1])}{q} & -1 \\ \frac{(x_j[1] - x_i[1])}{\sqrt{q}} & \frac{(x_j[2] - x_i[2])}{\sqrt{q}} & 0 \end{bmatrix}$$

where $q = (x_j[1] - x_i[1])^2 + (x_j[2] - x_j[2])^2$. The measurement residual can also be described by the difference between the actual measurement and the expected measurements given the current state estimates:

$$\Delta z = [z - h(\hat{x}_J)].$$

As result, this measurement residual can be used to refine the state estimates through the relationship:

$$\hat{x}_j = \hat{x}_j + \Delta \hat{x}.$$

The nonlinear, least squares estimate of $\Delta \hat{x}$ is given by $$\Delta \hat{x} = (H' R^{-1} H)^{-1} H' R^{-1} \Delta z,$$

where R is an estimate of the measurement noise covariance. It is to be appreciated that R is the expected value of the measurement noise covariance. The values may be modeled and empirically verified. Assuming that the measurement noise on the range and bearing errors are uncorrelated, a reasonable approximation of R is:

$$R = \begin{bmatrix} \left(\frac{\text{bearing quantization}}{2}\right)^2 & 0 & 0 & 0 \\ 0 & \left(\frac{\text{range quantization}}{2}\right)^2 & 0 & 0 \\ 0 & 0 & \left(\frac{\text{bearing quantization}}{2}\right)^2 & 0 \\ 0 & 0 & 0 & \left(\frac{\text{range quantization}}{2}\right)^2 \end{bmatrix}$$

A recursive form of this update is possible, such that every node can contribute a measurement to refine the state estimate of $\hat{x}$. In this example, the k+1 recursion builds on the $k^{th}$ recursion as:

$$H(k+1) = H|_{\hat{x}_{j,k}}$$

$$S(k+1) = H(k+1) P(k) H'(k+1) + R(k+1)$$

$$K(k+1) = P(k) H'(k+1) S^{-1}(k+1)$$

$$P(k+1) = [I - K(k+1) H(k+1)] P(k), \text{ where } P \text{ is initialized as}$$

$$P(0) = [H' R^{-1} H]^{-1}$$

$$\hat{x}_{j,k+1} = \hat{x}_{j,k} + K(k+1)[z - h(x_j)].$$

As the estimate converges to the true state, the covariance of the estimate errors will approach a $\chi_2$ distribution. This provides a test on the Mahalanobis distance of the state corrections (i.e. a normalized distance of the correction in the space of $[x_1, x_2, x_3]$):

$$d^2 = (\Delta x)' P^{-1} (\Delta x) = (\Delta x)' (H' R^{-1} H)(\Delta x).$$

It is to be appreciated that when the change in de between recursions becomes small and near constant, no additional information is present in the measurements to refine the state estimates and the process should be stopped.

Once a reasonable estimate of the room layout has been generated, refinements to the combined estimate may be carried out. For example, a refinement may be carried out such that combination of all node state estimates results in the maximum likelihood of the observed range and bearing measurements. If a given node, $x_j$ has n neighbors for which it has range and bearing measurements $\{x_{m_1}, x_{m_2}, \ldots, x_{m_n}\}$, then the collection of measurements of the n neighbors, made by node $x_j$ can be stacked into a vector:

$$z_{j \to m_1 \ldots m_n} = \begin{bmatrix} z_{j \to m_1} \\ z_{j \to m_2} \\ \vdots \\ z_{j \to m_n} \end{bmatrix}$$

where $$z_{j \to m_i} = h(x_j, x_{m_i}) = \begin{bmatrix} \operatorname{atan2}\left(\frac{x_{m_i}[2] - x_j[2]}{x_{m_i}[1] - x_j[1]}\right) - x_j[3] \\ \sqrt{(x_{m_i}[1] - x_j[1])^2 + (x_{m_i}[2] - x_j[2])^2} \\ \operatorname{atan2}\left(\frac{x_{m_i}[2] - x_j[2]}{x_{m_i}[1] - x_j[1]}\right) - x_{m_i}[3] - 180° \\ \sqrt{(x_{m_i}[1] - x_j[1])^2 + (x_{m_i}[2] - x_j[2])^2} \end{bmatrix}$$

It is to be appreciated by a person of skill with the benefit of this description that this measurement differs from the above, recursive measurement as the frame of reference is reversed. In particular, $x_j$ is mapping its location among is n neighbors whereas previously, one of the neighbors, $x_i$ was measuring $x_j$.

Treating the neighbor states as constants, the linearization of $\Delta x_j$ in this mapping reference frame is:

$$H_{m_i,j} \approx \frac{\partial}{\partial x_j} h |_{\hat{x}_{m_i}, \hat{x}_j} = \begin{bmatrix} \frac{(x_{m_i}[2] - x_j[2])}{q} & -\frac{(x_{m_i}[1] - x_j[1])}{q} & -1 \\ -\frac{(x_{m_i}[1] - x_j[1])}{\sqrt{q}} & -\frac{(x_{m_i}[2] - x_j[2])}{\sqrt{q}} & 0 \\ \frac{(x_{m_i}[2] - x_j[2])}{q} & -\frac{(x_{m_i}[1] - x_j[1])}{q} & 0 \\ -\frac{(x_{m_i}[1] - x_j[1])}{\sqrt{q}} & -\frac{(x_{m_i}[2] - x_j[2])}{\sqrt{q}} & 0 \end{bmatrix}$$

It is understood that this matrix is different to H from the recursive case, due to the change in the frame of reference. Furthermore, the $H_{m_1, \ldots, n, j}$ matrices can be stacked:

$$H_{m_1 \ldots m_n, j} = \begin{bmatrix} H_{m_1, j} \\ H_{m_2, j} \\ \vdots \\ H_{m_n, j} \end{bmatrix}$$

while the measurement transformation matrix for each measurement can be stacked:

$$h(x_j, x_{m_{1 \ldots j}}) = \begin{bmatrix} h(x_j, x_{m_1}) \\ h(x_j, x_{m_2}) \\ \vdots \\ h(x_j, x_{m_n}) \end{bmatrix}.$$

The measurement noise covariance remains the same, and a stacked $R_{z_1 \ldots n}$ matrix can be made by repeating the standard R matrix along the diagonal of $R_{z_1 \ldots n}$:

$$R_{z_{1 \ldots n}} = \begin{bmatrix} R & 0 & \cdots & 0 \\ 0 & R & \cdots & 0 \\ 0 & 0 & \ddots & 0 \\ 0 & 0 & \cdots & R \end{bmatrix}$$

A batch estimate of $x_j$, mapped to its n neighbors may then be determined by:

$$\Delta z = [z - h(\hat{x}_j)],$$

$$\Delta \hat{x}_j = (H'R^{-1}H)^{-1}H'R^{-1}\Delta z, \text{ and}$$

$$\hat{x}_j = \hat{x}_j + \Delta \hat{x}_j.$$

The normalized distance of the correction in the space of $[x_1, x_2, x_3]$ is again available as:

$$d^2 = (\Delta x)'(H'R^{-1}H)(\Delta x).$$

It is to be appreciated that this is a hyperellipsoid space spanned by the unit vectors of the state vector $x = [x_1, x_2, x_3]'$, which is a not a Cartesian space in meters, but a combination of meters, meters, and degrees, weighted by the likelihood of a measurement (an ellipsoid that is like a 3-D bell curve). Accordingly, the large distance in this space can be created by having an $x_3$ residual in degrees, even though the $x_1$ and $x_2$ residuals are low.

This batch refinement can be run at each node iteratively until the $d^2$ metric drops below a target value, or until the change in this maximum diminishes from run to run. Examples of the output of the recursive followed by the refining batch estimators may be refined through multiple iterations or reduce errors.

It is to be appreciated by a person of skill in the art that single lines of lights, for which there are few neighbors offering mutual measurements may have large bias errors on the $x_3$ state (i.e., their orientation around their vertical axis).

The sensors in the light fixtures are not oriented with respect to the building frame and the resulting geometric layout from the above steps will be built around the arbitrary datum of the sensor in the first light fixture found in the network. As a result, the layout is likely to appear rotated with respect to the building frame. However, light fixture installation typically arranges light fixtures into rows and columns within a room.

It is assumed in the present example that rows and columns of lights are uniformly spaced. Accordingly, the light fixtures may be grouped based on a histogram of the distances between fixtures. A weighted adjacency graph of the sensors within a room group may be generated using the range between neighbors as the edge weight. A histogram of weights within the adjacency graph, with bins of 0.5 width may then be created and adjusted such that only the entries above a threshold range bin are retained and other entries are set to zero. A new subgraph based on this updated adjacency matrix may be created where the edges define the lights which are grouped by their closest neighbors.

Referring to FIG. 8, a plot illustrates a real layout of light fixtures in a room (top right of plot), along with the refined geometric estimation about an arbitrary datum (bottom left of plot). By performing a linear regression on each group from the distance binning step, the rotation of these 'lines' are measured with respect to the plot based on the average slope to provide the estimated layout from the groups described and shown in FIG. 9. The nodes may then be rotated based on the arctan of the average line slope to align with a floorplan fixed to a building frame.

Upon aligning the light fixtures to a natural layout of the room, the light fixtures may be grouped into rows and columns using a 2-D histogram.

Simulations were completed using a DXF file of a floor plan with randomized noise applied to the derived range and bearing measurements. Small rooms with overdetermined measurements such as where each node has more than two neighbors, and the number of consecutive nodes away from the original node is less than about four repeatedly produced good results.

It should be recognized that features and aspects of the various examples provided above may be combined into further examples that also fall within the scope of the present disclosure.

What is claimed is:

1. An apparatus comprising:
    a communications interface to receive data from a plurality of lighting devices, wherein the data from a lighting device of the plurality of lighting devices includes a distance and a bearing for neighboring lighting devices of the lighting device, wherein the neighboring lighting devices are selected from the plurality of lighting devices;
    a memory storage unit to store the data received via the communications interface, wherein the data is to be stored in a database;
    an aggregator to generate aggregated data for each lighting device from the data in the database, wherein the aggregated data includes data from the plurality of lighting devices; and
    a processor is to calculate a betweeness value for the lighting device from the aggregated data using graph theory, wherein the betweeness value is used to classify each lighting device of the plurality of lighting devices in a group selected from a plurality of groups.

2. The apparatus of claim 1, further comprising a controller to control the group of lighting devices.

3. The apparatus of claim 2, wherein the communications interface is to transmit a command from the controller to the group of lighting devices to control an illumination level in a space.

4. The apparatus of claim 1, wherein the group of lighting devices is disposed within a predetermined distance from the apparatus.

5. The apparatus of claim 1, wherein the group of lighting devices is disposed within a room of a building.

6. The apparatus of claim 1, wherein the data from each lighting device of the plurality of lighting devices includes an offset bearing value, wherein the offset bearing value is determined at each lighting device.

7. The apparatus of claim 1, wherein the neighboring lighting devices are determined via a multi-shouter process.

8. The apparatus of claim 1, wherein the processor calculates a centrality value for the lighting device, and wherein the centrality value is used to classify the lighting device.

9. The apparatus of claim 1, wherein the processor calculates a closeness value for the lighting device, and wherein the closeness value is used to classify the lighting device.

10. A method comprising:
    receiving data from a plurality of lighting devices, wherein the data from a lighting device of the plurality of lighting devices includes a distance and a bearing for neighboring lighting devices of the lighting device, wherein the neighboring lighting devices are selected from the plurality of lighting devices;
    storing the data received in a database;
    aggregating data in the database to provide aggregated data for each lighting device, wherein the aggregated data includes data from the plurality of lighting devices;
    calculating a betweeness value for the lighting device from the aggregated data using graph theory; and
    classifying each lighting device of the plurality of lighting devices in a group selected from a plurality of groups based on the betweeness value.

11. The method of claim 10, further comprising controlling the group of lighting devices.

12. The method of claim 11, wherein controlling the group of lighting devices comprises transmitting a command to the group of lighting devices.

13. The method of claim 12, wherein the command is to control an illumination level in a space.

14. The method of claim 10, further comprising positioning the group of lighting devices within a predetermined distance from a controller.

15. The method of claim 10, wherein the data from each lighting device of the plurality of lighting devices includes an offset bearing value, wherein the offset bearing value is determined at each lighting device.

16. The method of claim 10, further comprising calculating a centrality value for a lighting device, and wherein the centrality value is used to classify the lighting device.

17. The method of claim 10, further comprising calculating a closeness value for a lighting device, and wherein the closeness value is used to classify the lighting device.

18. A non-transitory machine-readable storage medium encoded with instructions executable by a processor, the non-transitory machine-readable storage medium comprising:
    instructions to receive data from a plurality of lighting devices, wherein the data from a lighting device of the plurality of lighting devices includes a distance and a bearing for neighboring lighting devices of the lighting device, wherein the neighboring lighting devices are selected from the plurality of lighting devices;
    instructions to store the data received in a database;
    instructions to aggregate data in the database to provide aggregated data for each lighting device, wherein the aggregated data includes data from the plurality of lighting devices;
    instructions to calculate a betweeness value for the lighting device from the aggregated data using graph theory; and
    instructions to classify each lighting device of the plurality of lighting devices in a group selected from a plurality of groups based on the betweeness value.

* * * * *